(12) United States Patent
Yamasaki et al.

(10) Patent No.: US 8,690,206 B1
(45) Date of Patent: Apr. 8, 2014

(54) INTEGRATED STONE AND WATER SHIELD FOR BLIND SPOT MONITOR

(71) Applicant: Toyota Motor Engineering & Manufacturing North America, Inc., Erlanger, KY (US)

(72) Inventors: Bryan Else Yamasaki, Ann Arbor, MI (US); Mingher Fred Shen, Ann Arbor, MI (US); Josh David Fraley, South Lyon, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/644,844

(22) Filed: Oct. 4, 2012

(51) Int. Cl.
*B61F 99/00* (2006.01)

(52) U.S. Cl.
USPC .......................................... 293/15; 248/205.1

(58) Field of Classification Search
USPC ............... 293/15; 248/205.1; 340/435; 52/97
See application file for complete search history.

(56) References Cited

U.S. PATENT DOCUMENTS

| | | | |
|---|---|---|---|
| 6,184,782 B1 * | 2/2001 | Oda et al. | 340/435 |
| 6,927,677 B2 | 8/2005 | Anderson et al. | |
| 7,602,276 B2 * | 10/2009 | Madau | 340/435 |
| 7,748,174 B2 * | 7/2010 | Bonshor | 52/97 |
| 7,830,243 B2 * | 11/2010 | Buckley et al. | 340/435 |
| 2008/0315050 A1 | 12/2008 | Buckley et al. | |

* cited by examiner

*Primary Examiner* — Lori Lyjak
(74) *Attorney, Agent, or Firm* — Gifford, Krass, Sprinkle, Anderson & Citkowski, P.C.

(57) ABSTRACT

A bracket protecting a location on a vehicle. The bracket can have upper and bottom members that are spaced apart from each other and connected by a side member. The upper, bottom and side members of the bracket can also form an opening where a blind spot monitor can be located. The upper member can have a liquid diversion flange that prevents water from flowing onto an outer radar surface of the blind spot monitor and the bottom member can have a debris-blocking flange that protects or shields the outer radar surface from debris such as rocks, sand, etc., that are thrown up from a road surface towards the blind spot monitor.

22 Claims, 3 Drawing Sheets

INTEGRATED STONE AND WATER SHIELD FOR BLIND SPOT MONITOR

FIELD OF THE INVENTION

The present invention relates to a bracket for a blind spot monitor on a motor vehicle, and in particular to a bracket for shielding a blind spot monitor on a motor vehicle from debris and water.

BACKGROUND OF THE INVENTION

Blind spot monitors have been provided on vehicles to alert a driver when an object or vehicle is in a spot that the driver cannot readily see. Blind spot monitors have been placed behind a rear wheel of the vehicle and fixed to the rear panel, with this location affording the monitor to detect objects that are present in a location not able to be viewed by the driver via side mirrors and/or a rear view mirror. However, blind spot monitors have a sensitive, electromagnetic radiation emitting outer face which can be damaged with impact by debris or impaired by water flowing thereover.

Water flowing over the outer face of the blind spot monitor can come from a number of different sources. For example, many vehicles have moon roofs where water can pool. As such, and in order to prevent water from leaking into the vehicle, obscuring the moon roof glass, contributing to mold growth and the like, a drain hose can be included to drain the water from the moon roof housing. In some instances, this drain hose can direct the water to a vicinity proximate to the blind spot monitor.

Accordingly, there exists a need in the art to provide a structure that will protect the blind spot monitor from debris from the road surface and prevent water from flowing over the outer surface of the blind spot monitor. Additionally, to keep production costs down, the structure should not require redesign of the rear panel of the vehicle or require the drain hose end to be relocated.

SUMMARY OF THE INVENTION

The present invention relates to a bracket protecting a location on a vehicle. Additionally included is a rear panel of a vehicle with a mounting bracket, a rear tire of the vehicle that can throw debris towards the location, and a moon roof drain hose that can drain liquid from a moon roof housing towards the location.

The bracket may be formed of metal, plastic or any other resilient material used in the manufacture of vehicle parts, and the bracket can have upper and bottom members that are spaced apart from each other and connected by a side member. The upper, bottom and side members of the bracket can also form an opening where a blind spot monitor can be located.

The bracket can have a plurality of apertures for fasteners with at least one aperture located on each of the upper, bottom and side members. The bracket can also have a plurality of strengthening ribs that increase the bracket's durability and resilience. The bracket may be removably fixed to a mounting bracket using fasteners and the mounting bracket may or may not be welded to the rear panel of the vehicle.

The upper member can have a rear side that defines a rear plane and a liquid diversion flange extending at an angle from the rear plane. In addition, the liquid diversion flange can have a front side that defines a front plane. The front plane generally lies in a vertical direction outwardly from the opening and the rear plane generally lies in a vertical direction inwardly of the front plane. It should be appreciated that the directions outwardly and inwardly are taken with reference to the rear panel of the vehicle. The liquid diversion flange is dimensioned to divert liquid, e.g. water flowing from a moon roof drain hose, from the front plane towards the rear plane.

The bottom member can have a debris-blocking flange that extends at an angle from the bottom member in a generally horizontal direction. The debris-blocking flange is dimensioned to block debris thrown up by the rear tire from traveling upwards into the opening. Additionally, the debris-blocking flange may also block any other moving debris, for example, debris put into motion by other vehicles.

A blind spot monitor having an outer face and an inner face may be placed in the bracket. The outer face of the blind spot monitor lies in the opening, between the front and rear planes. The blind spot monitor is operable to detect an object in the blind spot of the vehicle as is known to those skilled in the art. The blind spot monitor outer face generally defines an outer vertical plane and the blind spot monitor inner face generally defines an inner vertical plane spaced apart from the outer vertical plane.

The liquid diversion flange can divert liquid from a path where the liquid would flow over the outer surface of the blind spot monitor to a path where the liquid will flow over the inner surface of the blind spot monitor. In this manner, liquid is prevented from flowing and/or freezing onto the outer face of the blind spot monitor. In addition, the debris-blocking flange protects the outer surface of the blind spot monitor from debris traveling in an upward direction, e.g. rocks, sand, etc., that is thrown upwardly from a road by the rear tire of the motor vehicle.

DETAILED DESCRIPTION OF THE INVENTION

A bracket for protecting a blind spot monitor mounted behind a rear tire in a vehicle is provided. The bracket can divert water from flowing across an outer face of the blind spot monitor and shield an inner face of the blind spot monitor from debris thrown up by the rear tire. As such, the bracket has use as a component for the motor vehicle.

Figure 1:
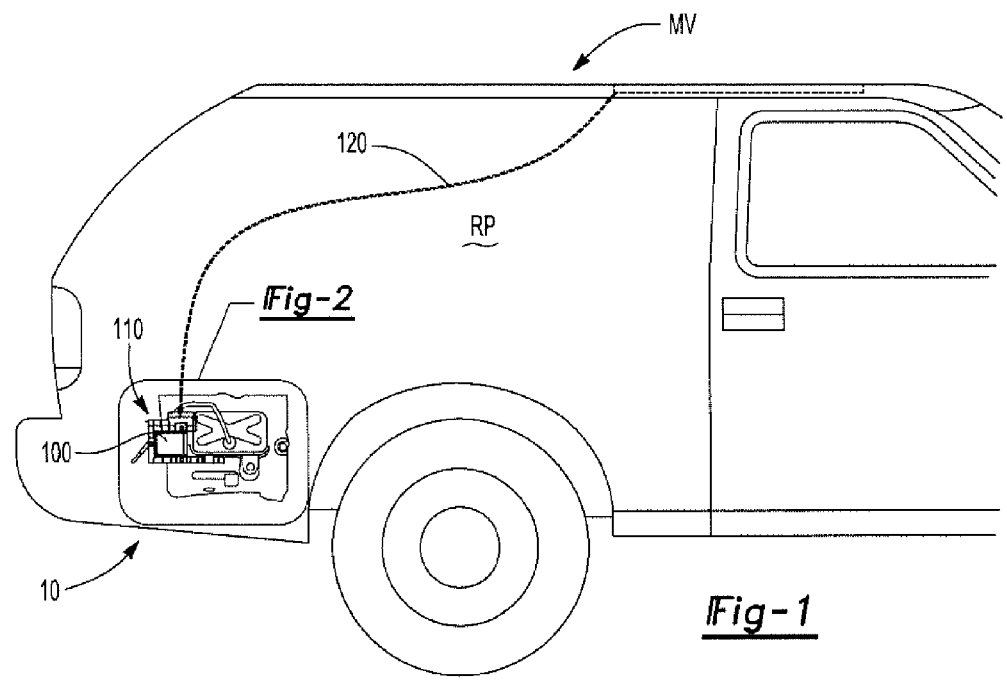
FIG. 1 is a side view of a motor vehicle with a blind spot monitor.
Figure 2:
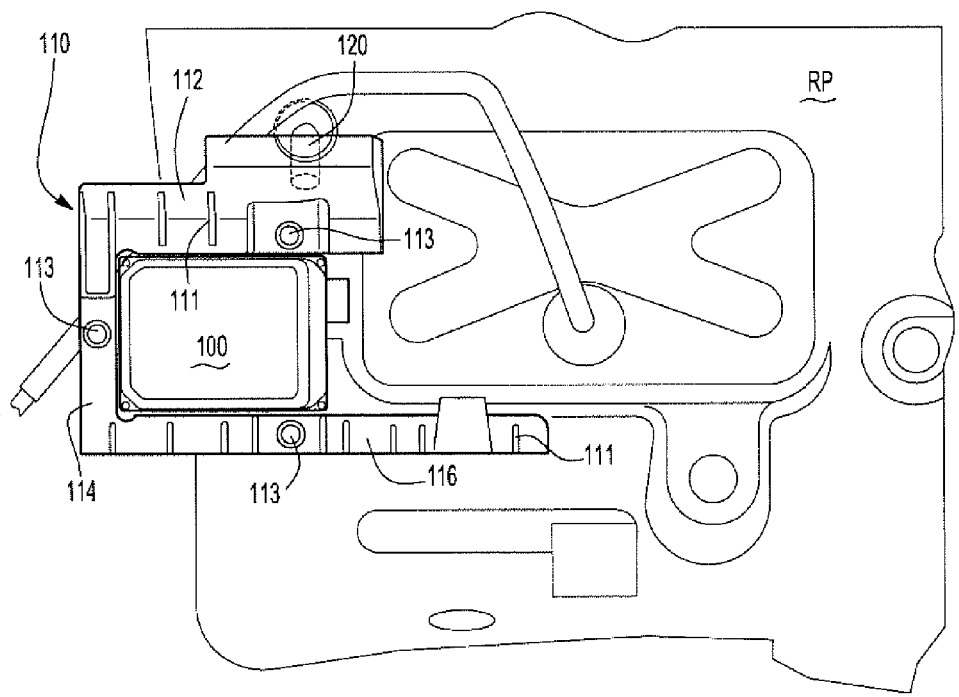
FIG. 2 is a side view of a bracket for protecting the blind spot monitor shown in FIG. 1 according to an embodiment of the present invention.
Figure 3:
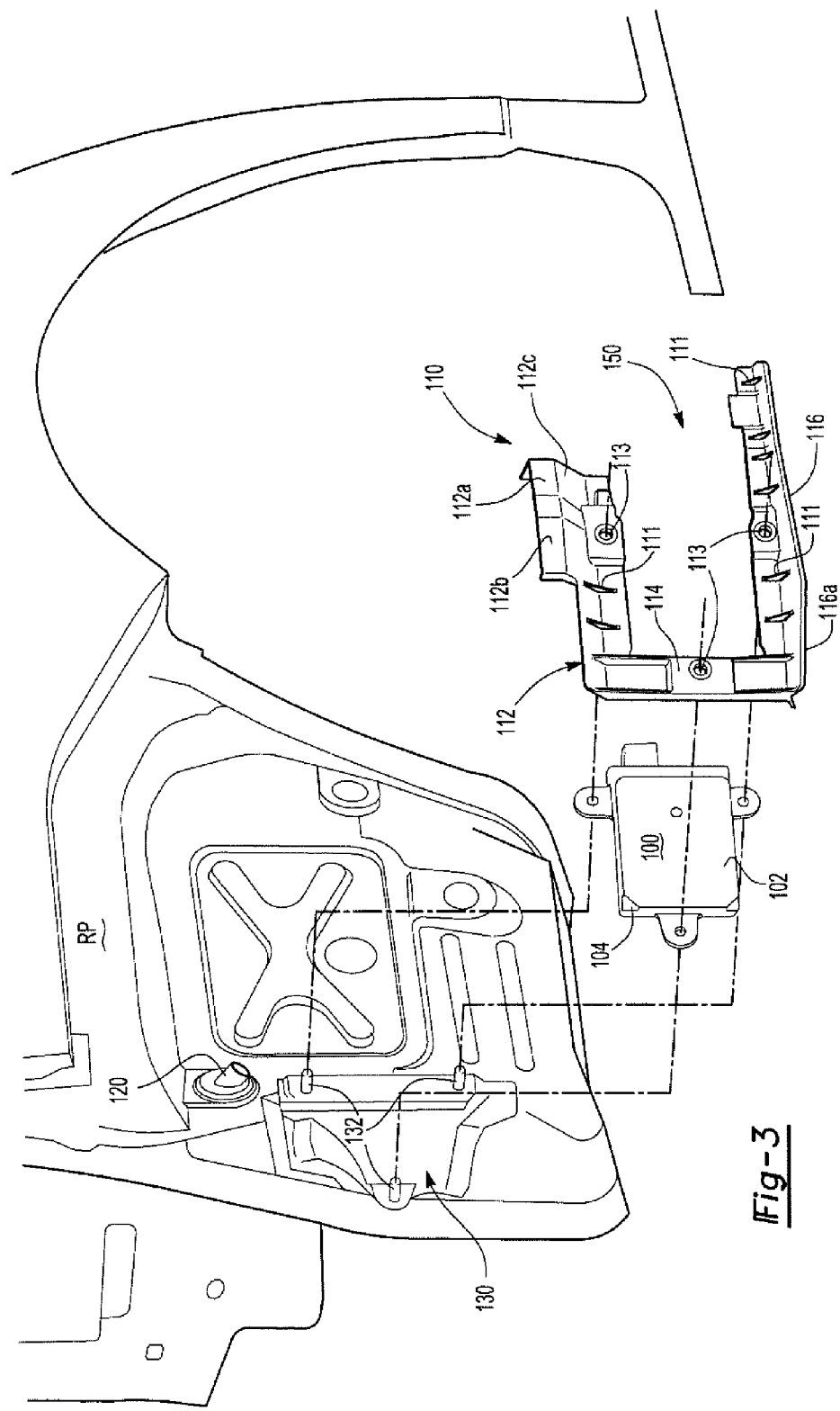
FIG. 3 is an exploded perspective view of the bracket shown in FIG. 2.
Figure 4:
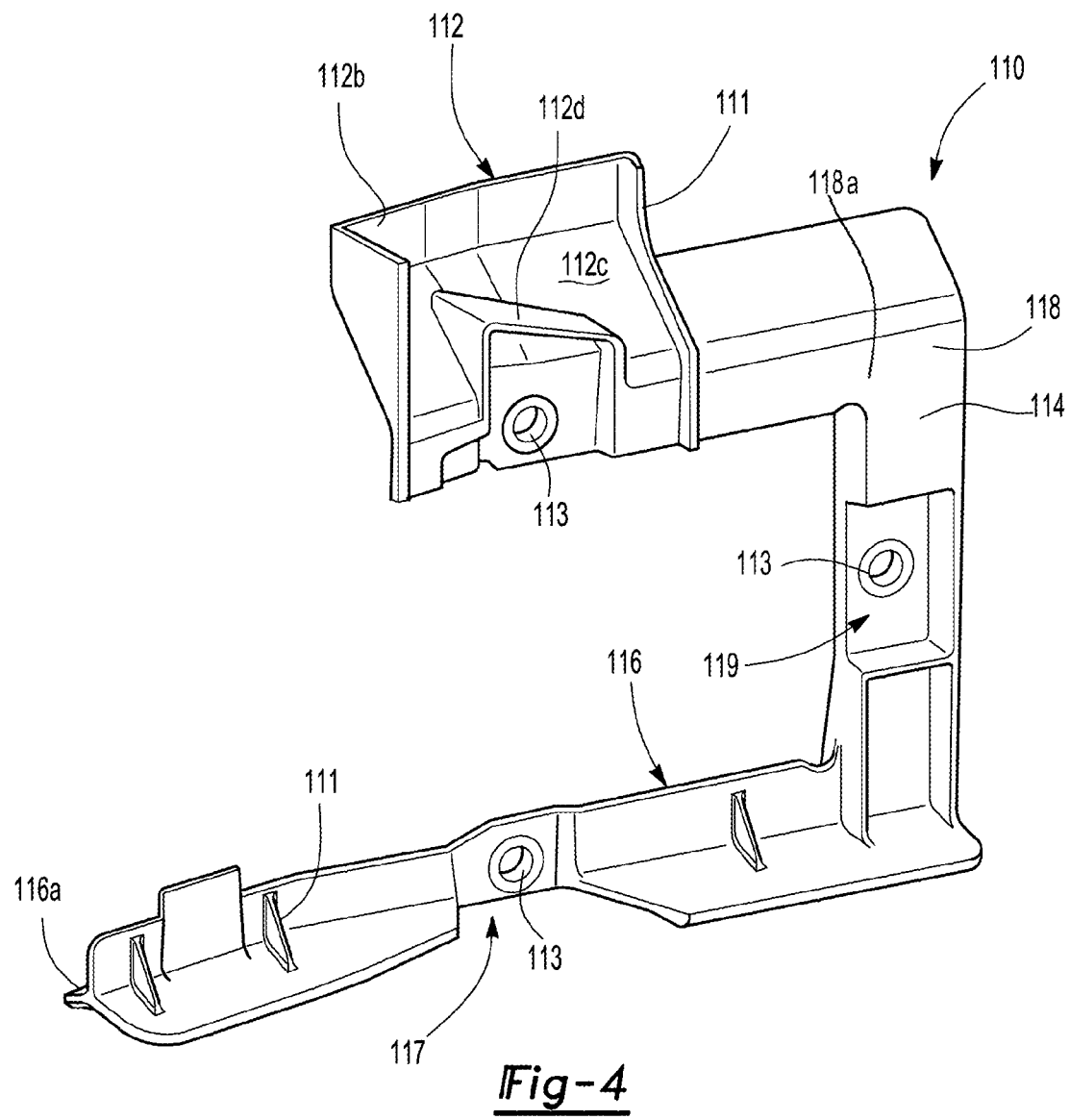
FIG. 4 is an exploded perspective view of the bracket shown in FIG. 3 illustrating an opposite side of the bracket.

Referring now to FIGS. 1-4, a motor vehicle MV with a rear panel RP, a blind spot monitor 100, a bracket 110, a moon roof drain hose 120 and a mounting bracket 130 is shown generally at reference numeral 10. The bracket 110 can have an upper member 112, a side member 114 and a bottom member 116. The side member 114 can connect and extend between the upper member 112 and the bottom member 116. The upper, side member and bottom members 112, 114, 116 can have ribs 111 for added strength and resilience. The upper, side and bottom members 112, 114, 116 can also have an aperture 113 to receive a fastener 132. The upper member 112 can have a rear side 118 which defines a rear plane 118*a*. Additionally, the upper member 112 can have a liquid diversion flange 112*a* and the bottom member 116 can have a debris-blocking flange 116a. The upper, side, and bottom members 112, 114, 116 can also form an opening 150.

The blind spot monitor 100 has an outer face 102 and an inner face 104. It is appreciated that the blind spot monitor 100 is operable to emit electromagnetic radiation that travels out through the outer face 102 and is further operable to measure the level of reflected radiation. By measuring the level of reflected radiation the blind spot monitor 100 can accurately determine whether or not an object, such as another vehicle (not shown) is present in a blind spot of the vehicle. The blind spot monitor outer face 102 is located in the opening 150 formed by the upper, side and bottom members 112, 114, 116 of the bracket 110.

The debris-blocking flange 116a is dimensioned to cover or shield the blind spot monitor 100 from debris being thrown upwardly from a road surface by the rear tire and otherwise potentially damaging the monitor 100. The debris-blocking flange 116a extends at an angle from the bottom member 116, e.g. in a generally horizontal direction, in order to shield the blind spot monitor 100 from debris. The optional ribs 111 can extend out from the bottom member 116 to the debris-blocking flange 116a and thereby reinforce the debris-blocking flange 116a.

The liquid diversion flange 112a can extend at an angle from the upper member 112 and has a generally vertical portion 112b and an angled portion 112c. The vertical portion 112b extends up from the angled portion 112c with both the vertical and angle portions dimensioned so as to block liquid flowing out from the moon roof drain hose 120 from flowing onto the outer face 102 of the blind spot monitor 100. The vertical portion 112b and angle portion 112c can be further dimensioned so as to divert liquid flowing out of the moon roof drain hose 120 onto the inner face 104 of the blind spot monitor 100. The liquid diversion flange 112a can also have a fastener shielding surface 112d that extends over an aperture 113 to shield the aperture 113 and the fastener 132 from liquid emitted from the moon roof drain hose 120. The liquid diversion flange vertical portion 112b also forms a front side which can define a front plane.

An inner side of the bracket 110 (FIG. 4) can also have an opening 117 within the bottom member 116 and/or a slot or depression 119 within the side member 114 that can afford for the blind spot monitor 100 to desirably fit adjacent and proximate to the mounting bracket 130. The mounting bracket 130 can be welded to the rear panel RP of the vehicle MV, be formed integrally into or with the rear panel RP or be attached to the rear panel RP with one or more threaded fasteners. The mounting bracket 130 can have a plurality of apertures 113 for receiving the fasteners 132 and thereby afford for the bracket 110 and the blind spot monitor 100 to be fixed and/or rigidly attached to the rear panel using fasteners such as bolts, screws and the like. The apertures 113 on the bracket 110, the blind spot monitor 100 and the mounting bracket 130 can be aligned such that only one set of fasteners is needed to secure the bracket and the blind spot monitor to the mounting bracket and rear panel. This alignment thus reduces the undue multiplication of parts keeping costs low, and reduces the complexity of installation relative to a system where separate fasteners must be used for the bracket and for the blind spot monitor.

The invention is not restricted to the illustrative examples and/or embodiments described above. The examples and/or embodiments are not intended as limitations on the scope of the invention. Methods, processes, apparatus, and the like described herein are exemplary and not intended as limitations on the scope of the invention. Changes herein and other uses will occur to those skilled in the art. The scope of the invention is defined by the scope of the claims.

We claim:

1. A structure for protecting a location, said structure comprising:
    a bracket having an upper member, a bottom member spaced apart from said upper member and a side member extending between said upper member and said bottom member, said upper member, bottom member and side member forming an opening therebetween; and
    said bottom member having a debris-blocking flange extending from said bottom member at an angle and dimensioned to block debris from a road surface from traveling into said opening;
    said upper member having a liquid diversion flange extending from said upper member at an angle;
    said liquid diversion flange having a front side, said front side generally forming a front plane;
    said upper member having a rear side, said rear side generally forming a rear plane;
    said liquid diversion flange dimensioned to divert liquid away from said front plane towards said rear plane;
    said debris-blocking flange dimensioned to block objects traveling upwardly from traveling into said opening.

2. The structure of claim 1, wherein said liquid diversion flange diverts water from a moon roof drain hose of a motor vehicle.

3. The structure of claim 1, wherein said bracket has a plurality of apertures.

4. The structure of claim 3, further comprising a mounting bracket with fasteners extending therefrom; and
    said plurality of apertures of said bracket located to be in alignment with said fasteners of said mounting bracket.

5. The structure of claim 4, wherein said upper member, bottom member, and side member each have one of said plurality of apertures.

6. The structure of claim 5, further comprising a motor vehicle rear side panel said bracket attached thereto such that said front plane is further away from said motor vehicle rear side panel than said rear plane.

7. The structure of claim 6, wherein said bracket is located behind a rear tire of the motor vehicle.

8. The structure of claim 7, wherein said debris-blocking flange protects said opening from rocks thrown in a rearward and upward direction by said rear tire of the motor vehicle.

9. A structure for protecting a location, said structure comprising:
    a bracket having an upper member, a bottom member oriented generally parallel to said upper member, and a side member attached to and extending between said upper member and said bottom member, said upper member, bottom member and side member forming an opening therebetween; and
    said upper member having a liquid diversion flange extending from said upper member at an angle and dimensioned to divert liquid behind said opening;
    said bottom member having a debris-blocking flange extending from said bottom member at an angle and dimensioned to block debris from a road surface from traveling into said opening.

10. The structure of claim 9, further comprising an object with an outer face and an inner face; and
    said outer face extending across said opening between said upper member, bottom member and side member.

11. The structure of claim 9, wherein said liquid diversion flange diverts water from a moon roof drain hose of a motor vehicle.

12. The structure of claim 10, wherein said liquid diversion flange is dimensioned to divert liquid from a plane generally parallel with and proximate to said outer face to a plane generally parallel with and proximate to said inner face.

13. The structure of claim 12, wherein said object is a blind spot monitor.

14. The structure of claim 13, wherein said bracket has a plurality of apertures.

15. The structure of claim 14, further comprising a mounting bracket with fasteners extending therefrom; and
said plurality of apertures of said bracket located to be in alignment with said fasteners of said mounting bracket.

16. The structure of claim 15, wherein said upper member, bottom member, and side member each have one of said plurality of apertures.

17. The structure of claim 16, further comprising a motor vehicle rear side panel, said bracket and said blind spot monitor attached thereto such that said outer face of said blind spot monitor faces an outward direction.

18. The structure of claim 17, wherein said bracket and said blind spot monitor are located behind a rear tire of a motor vehicle.

19. The structure of claim 18, wherein said debris-blocking flange protects said outer face of said blind spot monitor from rocks thrown in a rearward and upward direction by said rear tire of the motor vehicle.

20. A bracket for protecting a blind spot monitor on a motor vehicle, said bracket comprising:
a C-shaped bracket having an upper member, a bottom member oriented generally parallel to said upper member, and a side member attached to and extending between said upper member and said bottom member, said upper member, bottom member and side member forming a monitor opening therebetween; and
a blind spot monitor attached to said C-shape bracket, said blind spot monitor having an outer face and an inner face, said outer face extending across said monitor opening between said upper member, bottom member and side member;
said upper member having a liquid diversion flange extending from said upper member at an angle and dimensioned to divert liquid away from said outer face to said inner face of said blind spot monitor;
said bottom member having a debris-blocking flange extending from said bottom member at an angle and dimensioned to block debris from a road surface from contacting said outer surface of said blind spot monitor.

21. A structure for protecting a location, said structure comprising:
a bracket having an upper member, a bottom member spaced apart from said upper member and a side member extending between said upper member and said bottom member, said upper member, bottom member and side member forming an opening therebetween; and
said upper member having a liquid diversion flange extending from said upper member at an angle;
said liquid diversion flange having a front side, said front side generally forming a front plane;
said upper member having a rear side, said rear side generally forming a rear plane;
said liquid diversion flange dimensioned to divert liquid away from said front plane towards said rear plane.

22. A structure for protecting a location, said structure comprising:
a bracket having an upper member, a bottom member spaced apart from said upper member and a side member extending between said upper member and said bottom member, said upper member, bottom member and side member forming an opening therebetween; and
said bottom member having a debris-blocking flange extending from said bottom member at an angle and dimensioned to block debris from a road surface from traveling into said opening;
said upper member having a rear side, said rear side generally forming a rear plane;
said debris-blocking flange dimensioned to block objects traveling upwardly from traveling into said opening.

* * * * *